(12) United States Patent
Tiwari et al.

(10) Patent No.: US 11,985,584 B2
(45) Date of Patent: *May 14, 2024

(54) UE BEHAVIOR IN AN ALLOWED AREA OR A NON-ALLOWED AREA

(71) Applicant: NEC Corporation, Tokyo (JP)

(72) Inventors: Kundan Tiwari, Karnataka (IN); Toshiyuki Tamura, Tokyo (JP); Linghang Fan, Woking (GB)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/266,733

(22) PCT Filed: Aug. 7, 2019

(86) PCT No.: PCT/JP2019/031115
§ 371 (c)(1),
(2) Date: Feb. 8, 2021

(87) PCT Pub. No.: WO2020/032101
PCT Pub. Date: Feb. 13, 2020

(65) Prior Publication Data
US 2021/0314849 A1 Oct. 7, 2021

(30) Foreign Application Priority Data
Aug. 9, 2018 (IN) .............................. 201811029944

(51) Int. Cl.
*H04W 48/04* (2009.01)
*H04W 36/32* (2009.01)
*H04W 60/00* (2009.01)

(52) U.S. Cl.
CPC ........... *H04W 48/04* (2013.01); *H04W 36/32* (2013.01); *H04W 60/00* (2013.01)

(58) Field of Classification Search
CPC ..... H04W 48/04; H04W 36/32; H04W 60/00; H04W 76/12
See application file for complete search history.

(56) References Cited

U.S. PATENT DOCUMENTS

2017/0265183 A1* 9/2017 Chen ................... H04W 52/365
2018/0199279 A1 7/2018 Baek et al.
(Continued)

FOREIGN PATENT DOCUMENTS

| KR | 10-2018-0021636 A | 3/2018 |
| KR | 10-2018-0081969 A | 7/2018 |

OTHER PUBLICATIONS

International Search Report for PCT Application No. PCT/JP2019/031115, dated Oct. 29, 2019.
(Continued)

*Primary Examiner* — Marisol Figueroa
(74) *Attorney, Agent, or Firm* — Sughrue Mion, PLLC

(57) ABSTRACT

A method for a User Equipment (UE) (500) comprises performing registration procedure to 5G System (5GS); receiving at least one of area restriction related information indicating at least one of allowed area and not allowed area, wherein the area restriction related information is at least one of per Single Network Slice Selection Assistance Information (S-NSSAI) basis, per Access Point Name (APN) basis, and per S-NSSAI and APN basis; and determining whether or not to transmit a Protocol Data Unit (PDU) session related signaling based on the area information; wherein the UE (500) transmits the PDU session related signaling when the UE (500) enters Tracking Area (TA) present in the allowed area or when the UE (500) does not enter TA present in the not allowed area.

7 Claims, 7 Drawing Sheets

(56) References Cited

U.S. PATENT DOCUMENTS

| | | | |
|---|---|---|---|
| 2018/0317163 A1* | 11/2018 | Lee | H04W 16/02 |
| 2018/0317194 A1* | 11/2018 | Chen | H04W 76/27 |
| 2019/0075511 A1* | 3/2019 | Ryu | H04W 68/005 |
| 2019/0174449 A1* | 6/2019 | Shan | H04W 60/00 |
| 2019/0182788 A1 | 6/2019 | Lee et al. | |
| 2019/0223246 A1* | 7/2019 | Huang-Fu | H04W 76/18 |
| 2020/0100147 A1* | 3/2020 | Youn | H04W 36/14 |
| 2020/0120751 A1* | 4/2020 | Sugawara | H04W 80/10 |

OTHER PUBLICATIONS

Written opinion for PCT Application No. PCT/JP2019/031115, dated Oct. 29, 2019.

3rd Generation Partnership Project; Technical Specification Group Services and System Aspects; System Architecture for the 5G system; Stage 2 (Release 15), 3GPP TS 23.501 V15.2.0 (Jun. 2018), pp. 1-216, Jun. 18, 2018.

3rd Generation Partnership Project; Technical Specification Group Core Network and Terminals; Non-Access-Stratum (NAS) protocol for 5G System (5GS); Stage 3 (Release 15), 3GPP TS 24.501 V15.0.0 (Jun. 2018), pp. 1-337, Jun. 15, 2018.

Extended European Search Report for EP Application No. 19846849.8 dated Jul. 27, 2021.

MediaTek Inc., et al., "Allowed NSSAI and Access Type": 3GPP TSG-SA2 Meeting#126, S2-182915, Feb. 26-Mar. 2, 2018, Canada.

Ericsson, "Response paper to R3-131992(1)", 3GPP TSG-RAN WG3#99bis, R3-182319, Apr. 16-20, 2018, China.

Ericsson, "Correction for establishment of user-plane resources", 3GPP TSG-CT WG1 Meeting #111bis, C1-184891, Jul. 9-13, 2018, France.

Ericsson, "Response paper to R3-181992(1)", 3GPP TSG-RAN WG3#99bis, R3-182319, Apr. 16-20, 2018, China.

Japanese Office Action for JP Application No. 2021-504852 dated Mar. 22, 2022 with English Translation.

Ericsson, Response to R3-181992 (2) (draft CR for Introduction of 5GS restriction in S1AP)[online], 3GPP TSG RAN WG3 #99bis R3-182320, Apr. 13, 2018.

\* cited by examiner

UE BEHAVIOR IN AN ALLOWED AREA OR A NON-ALLOWED AREA

This application is a National Stage Entry of PCT/JP2019/031115 filed on Aug. 7, 2019, which claims priority from Indian Patent Application 201811029944 filed on Aug. 9, 2018, the contents of all of which are incorporated herein by reference, in their entirety.

TECHNICAL FIELD

The present disclosure relates to the method of a UE in an allowed area or a non-allowed area.

BACKGROUND ART

A User Equipment (UE) supporting 5G System (5GS) or/and Evolved Packet System (EPS) can be configured as a voice centric UE or a data centric UE. The voice centric UE always ensures that the UE is able to get a voice service (e.g. IP Multimedia Sub system (IMS) voice call). The data centric UE always ensures that the UE always gets data service. The voice centric UE may perform Radio Access Technology (RAT) selection or system selection procedure to get the voice service if the voice service is not possible in the current system.

In the 5GS a UE is provided with either an allowed area or a non-allowed area, not both, during the registration procedure or the UE configuration update procedure according to Non patent literature 1. Each area is identified by explicit tracking area identities and/or other geographical information (e.g., longitude/latitude, zip code, etc). Based on the received allowed area information or non-allowed area information, the UE constitutes an allowed area information and a non-allowed area information. The UE can initiate Non Access Stratum (NAS) signalling (5G Mobility Management (5GMM) and 5G Session Management (5GSM)) for any kind of service when the UE is in a Tracking Area (TA) present in the allowed area information. The UE cannot initiate any 5GSM signalling or 5GMM signalling related to establishment of user plane when the UE is in a TA present in the non-allowed area information.

CITATION LIST

Non Patent Literature

NPL 1: 3GPP TS 23.501 V15.2.0 (2018-6)

SUMMARY OF INVENTION

Technical Problem

Problem Statement 1:

When a voice centric UE enters TA which is present in the non-allowed area, then the UE is not allowed to establish any Protocol Data Unit (PDU) session or user plane bearer for any service including the IMS service. Therefore the IMS voice call is not possible as long as the UE stays in the non-allowed area. The UE supporting S1 mode may get IMS voice service in the EPS network but the UE will stay in the non-allowed TA due to cell reselection criteria. The voice centric UE may not get IMS voice service even if there is an Evolved Universal Terrestrial Radio Access Network (E-UTRAN) cells which provides IMS voice service.

Problem Statement 2:

According to the current 5GS, when the UE receives non-allowed area list, the UE is not allowed to establish PDU session or user plane for any kind of services (eMBB (IMS voice call, Internet), mIoT, URLCC, V2X etc) i.e. all the application services (IMS service, internet, mIoT, URLCC, V2X) are blocked in the any non-allowed areas in the list. This is a very restrictive requirement for the UE. So the current mechanism does not provide a way to allow some services (e.g. V2X, IMS) and not to allow some services (e.g. IoT) in the TA.

Solution to Problem

A method for a User Equipment (UE) according to a first aspect of the present disclosure includes performing registration procedure to 5G System (5GS); receiving at least one of area restriction related information indicating at least one of allowed area and not allowed area, wherein the area restriction related information is at least one of per Single Network Slice Selection Assistance Information (S-NSSAI) basis, per Access Point Name (APN) basis, and per S-NSSAI and APN basis; determining whether or not to transmit a Protocol Data Unit (PDU) session related signaling based on the area information; wherein the UE transmits the PDU session related signaling when the UE enters Tracking Area (TA) present in the allowed area or when the UE does not enter TA present in the not allowed area.

A User Equipment (UE) according to a second aspect of the present disclosure includes a memory storing instructions; at least one hardware processor configured to process the instruction to: perform registration procedure to 5G System (5GS); receive at least one of area restriction related information indicating at least one of allowed area and not allowed area, wherein the area restriction related information is at least one of per Single Network Slice Selection Assistance Information (S-NSSAI) basis, per Access Point Name (APN) basis, and per S-NSSAI and APN basis; determine whether or not to transmit a Protocol Data Unit (PDU) session related signaling based on the area information; wherein the UE transmits the PDU session related signaling when the UE enters Tracking Area (TA) present in the allowed area or when the UE does not enter TA present in the not allowed area.

DESCRIPTION OF EMBODIMENTS

Abbreviations

Figure 1:
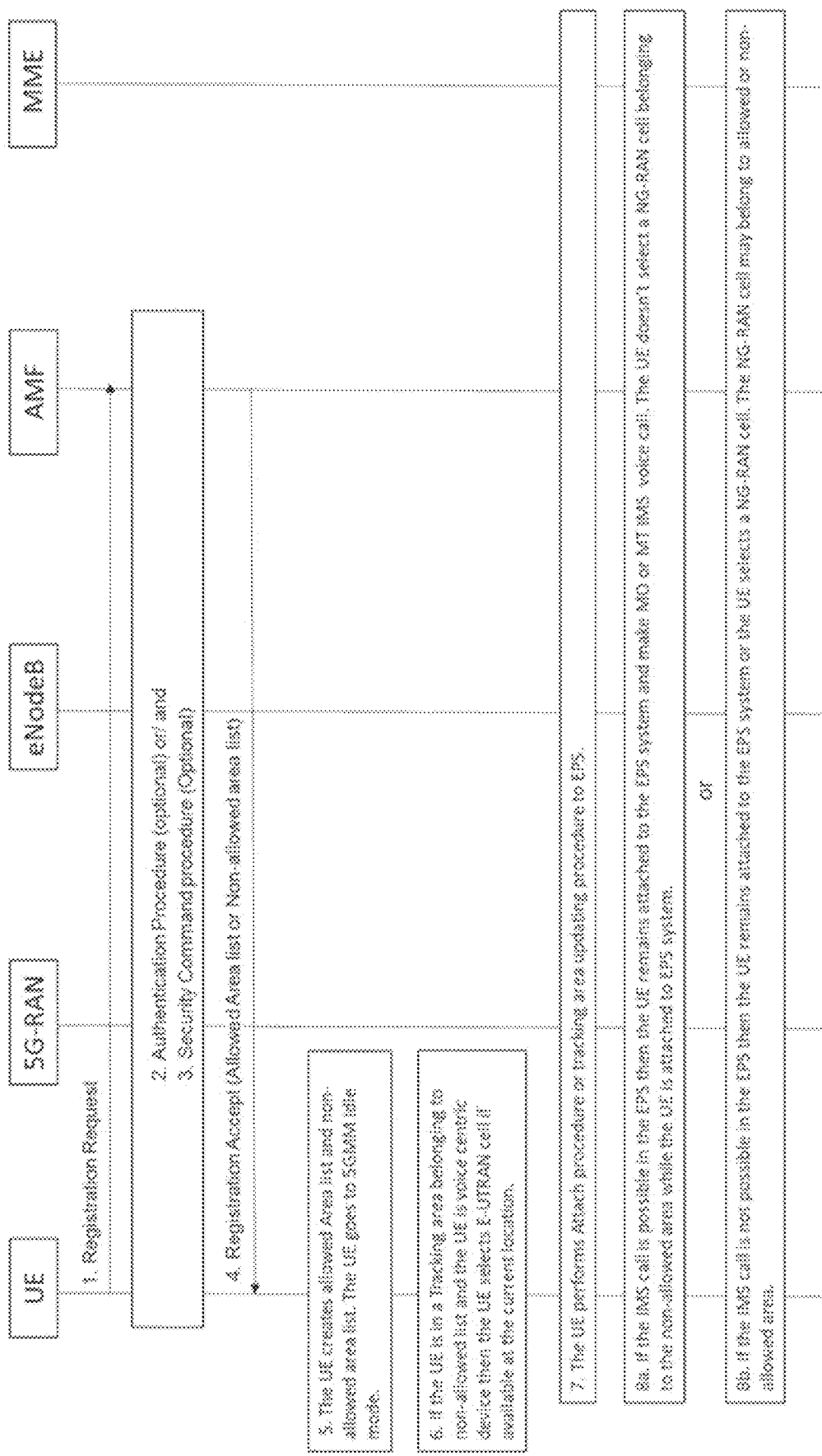
FIG. 1 illustrates Fall back to EPS to get an IMS service.

For the purposes of the present document, the abbreviations given in 3GPP TR 21.905 V15.0.0 (2018-03) and the following apply. An abbreviation defined in the present document takes precedence over the definition of the same abbreviation, if any, in 3GPP TR 21.905 V15.0.0 (2018-03).

5GC 5G Core Network
5GS 5G System
5G-AN 5G Access Network
5G-GUTI 5G Globally Unique Temporary Identifier
5G S-TMSI 5G S-Temporary Mobile Subscription Identifier
5QI 5G QoS Identifier
A Application Function
AMF Access and Mobility Management Function
AN Access Node
AS Access Stratum
AUSF Authentication Server Function
CM Connection Management
CP Control Plane
CSFB Circuit Switched (CS) Fallback
DL Downlink
DN Data Network
DNAI DN Access Identifier
DNN Data Network Name
EDT Early Data Transmission
EPS Evolved Packet System
EPC Evolved Packet Core
FQDN Fully Qualified Domain Name
GFBR Guaranteed Flow Bit Rate
GMLC Gateway Mobile Location Centre
GPSI Generic Public Subscription Identifier
GUAMI Globally Unique AMF Identifier
HR Home Routed (roaming)
I-RNTI I-Radio Network Temporary Identifier
LADN Local Area Data Network
LBO Local Break Out (roaming)
LMF Location Management Function
LRF Location Retrieval Function
MAC Medium Access Control
MFBR Maximum Flow Bit Rate
MICO Mobile Initiated Connection Only
MME Mobility Management Entity
N3IWF Non-3GPP Inter Working Function
NAI Network Access Identifier
NAS Non-Access Stratum
NEF Network Exposure Function
NF Network Function
NG-RAN Next Generation Radio Access Network
NR New Radio
NRF Network Repository Function
NSI ID Network Slice Instance Identifier
NSSAI Network Slice Selection Assistance Information
NSSF Network Slice Selection Function
NSSP Network Slice Selection Policy
PCF Policy Control Function
PEI Permanent Equipment Identifier
PER Packet Error Rate
PFD Packet Flow Description
PLMN Public land mobile network
PPD Paging Policy Differentiation
PPI Paging Policy Indicator
PSA PDU Session Anchor
QFI QoS Flow Identifier
QoE Quality of Experience
(R)AN (Radio) Access Network
RLC Radio Link Control
RM Registration Management
RQA Reflective QoS Attribute
RQI Reflective QoS Indication
RRC Radio Resource Control
SA NR Standalone New Radio
SBA Service Based Architecture
SBI Service Based Interface
SD Slice Differentiator
SDAP Service Data Adaptation Protocol
SEAF Security Anchor Functionality
SEPP Security Edge Protection Proxy
SMF Session Management Function
S-NSSAI Single Network Slice Selection Assistance Information
SSC Session and Service Continuity
SST Slice/Service Type
SUCI Subscription Concealed Identifier
SUPI Subscription Permanent Identifier
UDSF Unstructured Data Storage Function
UL Uplink
UL CL Uplink Classifier
UPF User Plane Function
UDR Unified Data Repository
URSP UE Route Selection Policy
SMS Short Message Service
SMSF SMS Function
MT Mobile Terminated Definitions For the purposes of the present document, the terms and definitions given in 3GPP TR 21.905 V15.0.0 (2018-03) and the following apply. A term defined in the present document takes precedence over the definition of the same term, if any, in 3GPP TR 21.905 V15.0.0 (2018-03).

In all solutions listed below allowed area information and allowed area list are allowed area as defined in the sub clause 5.3.4.1.1 and 5.3.4.1.2 of 3GPP TS 23.501 V15.2.0 (2018-6).

In all solutions listed below non-allowed area information and non-allowed area list are non-allowed area defined in the sub clause 5.3.4.1.1 and 5.3.4.1.2 of 3GPP TS 23.501 V15.2.0 (2018-6).

In all solution below 5G-RAN is 5G-AN as defined in 3GPP TS 23.501 V15.2.0 (2018-6).

First Aspect (Solution 1 Solves Problem Statement 1)

Selecting an E-UTRAN Cell by a Voice Centric UE Upon Entering Non-Allowed Area

This solution discloses the following technical aspects to the Mobility Restrictions in the 5GS.

A voice centric UE supporting S1 and N1 mode performs registration procedure to the 5GS successfully. The UE is provided with an allowed area or non-allowed area information during the registration procedure in the Registration Response message or during Generic UE configuration update procedure in CONFIGURATION UPDATE COMMAND message. From the received allowed area information or non-allowed area information, the UE derives allowed area information and non-allowed area information as described in the sub clause 5.3.4.1.1 of 3GPP TS 23.501 V15.2.0 (2018-6).

Upon entering the non-allowed area, the UE selects E-UTRAN cell if available at the location and if the UE is voice centric UE. The UE stores the allowed and non-allowed area information.

The UE performs attach or tracking area procedure to the EPS. If the IMS service is allowed for the UE in the EPS, then the UE stays in the E-UTRAN cell and may make MO and MT IMS voice call. The UE does not select non-allowed area of the 5GS. If the 5G-RAN cell belongs to the allowed area, the UE selects the 5G-RAN cell upon cell reselection procedure.

If the UE configuration is changed to data centric or the IMS service is disabled on the UE, then the UE may selects a cell belonging to non-allowed area after cell selection or reselection procedure.

Detailed Step of Solution 1:

FIG. 1 shows Fallback to EPS to get an IMS service.

In steps 1-4 of FIG. 1, a voice centric UE supporting S1 and N1 mode performs registration procedure to the 5GS successfully. The network may optionally perform authentication, security mode command or identity procedure during registration procedure. The UE is provided with an allowed area or non-allowed area information during the registration procedure in the Registration Response message or during Generic UE configuration update procedure in CONFIGURATION UPDATE COMMAND message.

In step 5 of FIG. 1, from the received allowed area information or non-allowed area information, the UE derives allowed area information and non-allowed area information as described in the sub clause 5.3.4.1.1 and 5.3.4.1.2 of 3GPP TS 23.501 V15.2.0 (2018-6).

In step 6 of FIG. 1, when a UE selects or reselects a 5G-RAN cell belonging to the non-allowed area, then the UE performs cell selection procedure to select E-UTRAN cell available at the location. That is, if the UE is in a TA belonging to non-allowed list and the UE is a voice centric device, then the UE performs cell selection procedure to select E-UTRAN cell available at the location.

Alternatively, when a UE selects or reselects a 5G-RAN cell belonging to the non-allowed area, then the UE stays in the 5G-RAN as far as there is no IMS traffic needs to communicate with the IMS in the UE. When the UE needs to send IMS traffic, ex MO-call over the IMS, then UE performs cell selection procedure to selects E-UTRAN cell available at the location.

The UE selects E-UTRAN cell available at the location. The UE stores the allowed and non-allowed area information.

In step 7 of FIG. 1, the UE performs attach procedure or tracking area updating procedure according to the procedure successfully as defined in the sub-clause 4.11.1.3.1 of 3GPP TS 23.502 V15.2.0 (2018-6).

The UE performs one of the following two steps.

In step 8a of FIG. 1, if the IMS call is possible in the EPS, then the UE remains attached to the EPS and makes MO or MT IMS call. The UE doesn't select a 5G-RAN cell belonging to the non-allowed area while the UE is attached to EPS. The UE may select 5G-RAN cell in the allowed area due to cell reselection.

In step 8b of FIG. 1, if the IMS call is not possible in the EPS, then the UE remains attached to the EPS and may use the CSFB feature to have telephony services or the UE selects a 5G-RAN cell. The 5G-RAN cell may belong to allowed or non-allowed area.

In the above scenario the UE registered to the MME provides allowed area information or non-allowed area information to the eNB or gNB when the UE state changes to EMM CONNECTED. The eNB or gNB does not consider the non-allowed area for handover to gNB or ng-eNB connected to 5GC. The MME also provides the allowed area information or non-allowed area information to the eNB or gNB when the UE state changes to EMM CONNECTED mode for the case when the UE first attaches to the EPS after switch on. In one example, the allowed list information or non-allowed list information is sent in the handover restriction list IE in INITIAL CONTEXT SETUP REQUEST or HANDOVER REQUEST or DOWNLINK NAS TRANSPORT message as defined in 3GPP TS 36.413 V15.2.0 (2018-6). In another example, it is sent in new information element in the new S1-AP message or existing message (e.g. INITIAL CONTEXT SETUP REQUEST or HANDOVER REQUEST or DOWNLINK NAS TRANSPORT).

Second Aspect (Solution 2 Solves Problem Statement 1)

Disabling the 5G-RAN Capability and Selecting the E-UTRAN Cell by a Voice Centric UE This solution discloses the following technical aspects to the Mobility Restrictions in the 5GS.

A voice centric UE supporting S1 and N1 mode performs registration procedure to the 5GS successfully. The UE is provided with an allowed area or non-allowed area information during the registration procedure in the Registration Response message or during Generic UE configuration update procedure in CONFIGURATION UPDATE COMMAND message. From the received allowed area information or non-allowed area information, the UE derives allowed area information and non-allowed area information as described in the sub clause 5.3.4.1.1 of 3GPP TS 23.501 V15.2.0 (2018-6).

Upon entering the non-allowed area, the UE disable the UE's N1 mode capability and follows the procedure as defined in sub-clause 4.9 of 3GPP TS 24.501 V15.0.0 (2018-06). The UE stores the allowed area and non-allowed area information.

The UE performs attach or tracking area procedure to the EPS. If the IMS service is allowed for the UE in the EPS, then the UE stays in the E-UTRAN cell and make MO and MT IMS voice call.

If the UE configuration is changed to data centric, the IMS service is disabled on the UE, or the IMS voice service is not possible in the E-UTRAN cell, then the UE enables the 5G-RAN service, and the UE may selects a cell belonging to non-allowed area after cell selection or reselection procedure.

Figure 2:
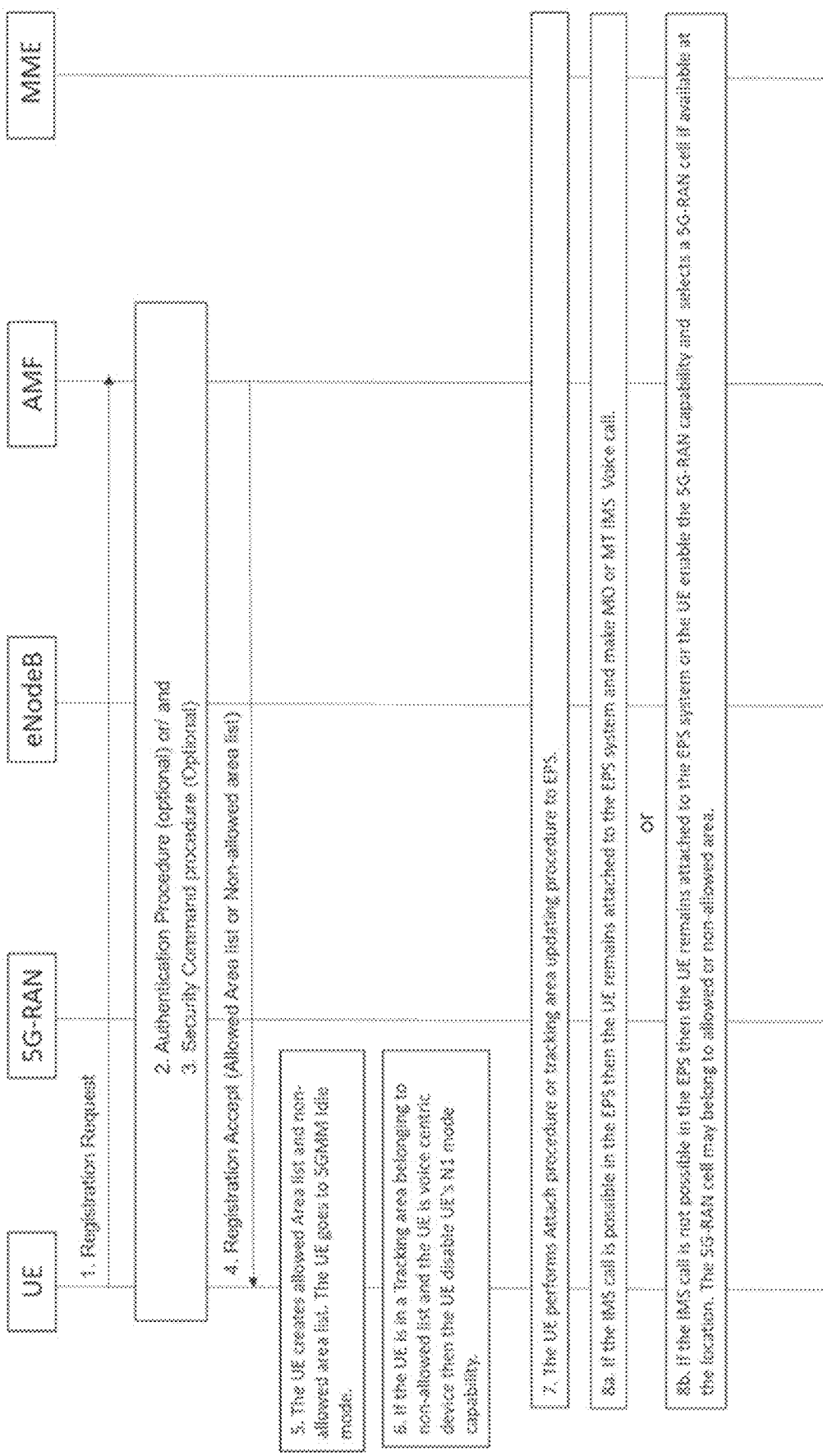
FIG. 2 illustrates that a UE disables the 5G-RAN capability of a UE and selects E-UTRAN cell.

Detailed Step of Solution 2:

FIG. 2 shows that the UE disables the 5G-RAN capability and selects E-UTRAN cell.

In steps 1-4 of FIG. 2, a voice centric UE supporting S1 and N1 mode performs registration procedure to the 5GS successfully. The network may Optionally perform authentication, security mode command or identity procedure during registration procedure. The UE is provided with an allowed area or non-allowed area information during the registration procedure in the Registration Response message or during Generic UE configuration update procedure in CONFIGURATION UPDATE COMMAND message.

In step 5 of FIG. 2, from the received allowed area information or non-allowed area information, the UE derives allowed area information and non-allowed area information as described in the sub clause 5.3.4.1.1 of 3GPP TS 23.501 V15.2.0 (2018-6).

In step 6 of FIG. 2, when a UE selects a 5G-RAN cell belonging to the non-allowed area, then the UE disables the UE's N1 mode capability and follows the procedure as defined in sub-clause 4.9 of 3GPP TS 24.501 V15.0.0 (2018-06). The UE selects E-UTRAN cell available at the location. The UE stores the allowed and non-allowed area information.

Alternatively, when a UE selects or reselects a 5G-RAN cell belonging to the non-allowed area, then the UE stays in the 5G-RAN as far as there is no IMS traffic needs to communicate with the IMS in the UE. When the UE needs to send IMS traffic, ex MO-call over the IMS, then the UE disables the UE's N1 mode capability and follows the procedure as defined in sub-clause 4.9 of 3GPP TS 24.501 V15.0.0 (2018-06).

In step 7 of FIG. 2, the UE performs attach procedure or tracking area updating procedure according to the procedure successfully as defined in the sub-clause 4.11.1.3.1 and 3GPP TS 23.502 V15.2.0 (2018-6).

The UE performs one of the following two steps.

In step 8a of FIG. 2, if the IMS call is possible in the EPS, then the UE remains attached to the EPS and make MO or MT IMS call.

In step 8b of FIG. 2, if the IMS call is not possible in the EPS, then the UE remains attached to the EPS or the UE enables the 5G-RAN capability and selects a 5G-RAN cell. The 5G-RAN cell may belong to allowed or non-allowed area.

Third Aspect (Solution 3 Solves Problem Statement 1)

Allowing IMS Voice Call in the Non-Allowed Area

This solution discloses the following technical aspects to the Mobility Restrictions in the 5GS.

A UE supporting S1 and N1 mode performs registration procedure to the 5GS successfully. The network may optionally perform authentication, security mode command or identity procedure during registration procedure. The UE is provided with an allowed area or non-allowed area information during the registration procedure in the Registration Response message or during Generic UE configuration update procedure in CONFIGURATION UPDATE COMMAND message.

From the received allowed area information or non-allowed area information, the UE derives allowed area information and non-allowed area information as described in the sub clause 5.3.4.1.1 of 3GPP TS 23.501 V15.2.0 (2018-6).

A UE selects or reselects a 5G-RAN cell belonging to the non-allowed area, then the UE makes IMS voice call in the non-allowed area i.e. the UE establishes a PDU session related to the IMS voice service in a non-allowed area and the UE establishes user plane for the IMS voice call. If the PDU session has already been established for the IMS voice service, then the UE establishes user plane for the IMS voice call and the IMS voice call is initiated. The UE does not initiate NAS signalling related to establish PDU session or user plane for non-IMS voice call (e.g. Internet, IoT etc).

Figure 3:
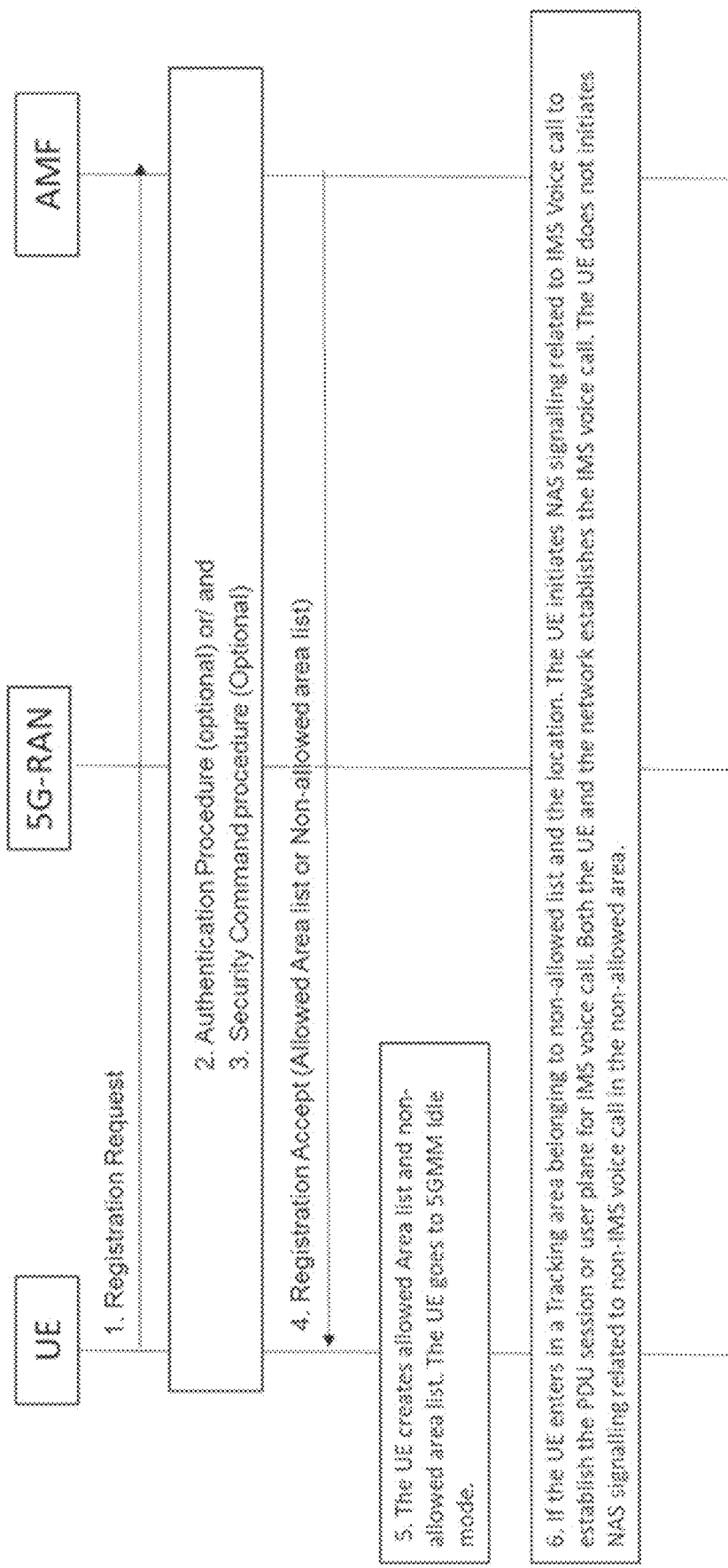
FIG. 3 illustrates that a IMS service is allowed in the non-allowed area.

Detailed Step of Solution 3:

FIG. 3 shows that IMS service is allowed in the non-allowed area.

In steps 1-4 of FIG. 3, a voice centric UE supporting S1 and N1 mode performs registration procedure to the 5GS successfully. The network may optionally perform authentication, security mode command or identity procedure during registration procedure. The UE is provided with an allowed area or non-allowed area information during the registration procedure in the Registration Response message or during Generic UE configuration update procedure in CONFIGURATION UPDATE COMMAND message.

In step 5 of FIG. 3, from the received allowed area information or non-allowed area information, the UE derives allowed area information and non-allowed area information as described in the sub clause 5.3.4.1.1 of 3GPP TS 23.501 V15.2.0 (2018-6).

In step 6 of FIG. 3, a UE selects or reselects a 5G-RAN cell belonging to the non-allowed area. Even the UE is in the non-allowed area, the UE is allowed to make IMS voice call in the non-allowed area if the UE is a voice centric UE i.e. the UE establishes a PDU session related to the IMS voice service in a non-allowed area and the UE establishes user plane for the IMS voice call. If the PDU session has already been established for the IMS voice service then the UE establishes user plane for the IMS voice call and the IMS voice call is initiated.

If the 5GS recognizes that the UE enters the non-allowed area, the 5GS shall not release the N3 terminating UPF of the PDU session that is used for the IMS service by the CN-initiated selective deactivation of UP connection of an existing PDU Session procedure in the sub clause 4.3.7 of 3GPP TS 23.502 V15.2.0 (2018-6). This allows the IMS to page UE as the UE can maintain the IMS registered. When the AMF is requested to page the UE from the SMF for IMS-MT call, the AMF pages UE even the AMF recognizes that the UE is in the non-allowed area. This procedure may only apply to those of UEs that are voice centric.

The UE does not initiate NAS signalling related to establish PDU session or user plane for non-IMS voice call (e.g. Internet, IoT etc).

In this solution, the UE can be a Voice centric UE or Data Centric UE or a UE which is neither Voice centric nor Data centric.

In the above scenario, the 5G-RAN performs handover to the non-allowed area if IMS call is established otherwise the 5G-RAN does not perform handover to the non-allowed area.

Forth Embodiment (Solution 4 Solves Problem Statement 2)

Configuring Allowed Area or Non-Allowed Area Per Service Basis

This solution discloses the following technical aspects to the Mobility Restrictions in the 5GS.

The Unified Data Management (UDM) has the following subscriber data per UE.
 (a) Allowed area/Not Allowed area information per S-NSSAI basis.
 (b) Allowed area/Not Allowed area information per APN basis.
 (c) Allowed area/Not Allowed area information per S-NSSAI and APN basis.

A UE successfully performs Registration procedure to the 5GS. The network (e.g. AMF) provides allowed area information or non-allowed area information list per S-NSSAI or per DNN or per S-NSSAI and DNN basis during the registration procedure in the Registration Accept message or during the generic UE configuration update procedure in the CONFIGURATION UPDATE COMMAND message.

If the UE receives allowed area information for an S-NSSAI, then the UE initiates NAS signalling related to a PDU session of the S-NSSAI only when the UE enters TA present in the allowed area information. The UE does not initiate any NAS signalling related to the PDU session of other S-NSSAI when the UE enters TA present in the allowed area information.

Similarly, if the UE receives allowed area information for a DNN, then the UE initiates NAS signalling related to the PDU session of the DNN only when the UE enters TA present in the allowed area information. The UE does not initiate any NAS signalling related to the PDU session of other DNN when the UE enters TA present in the allowed area information.

Similarly, if the UE receives allowed area information for an S-NSSAI and DNN, then the UE initiates NAS signalling related to the PDU session of the S-NSSAI and DNN only when the UE enters TA present in the allowed area information. The UE does not initiate any NAS signalling related to the PDU session of other S-NSSAI and DNN when the UE enters TA present in the allowed area information.

If the UE receives non-allowed area information for an S-NSSAI, then the UE does not initiate NAS signalling related to the PDU session of the S-NSSAI only when the UE enters TA present in the non-allowed area information. The UE initiates any NAS signalling related to the PDU session of other S-NSSAI when the UE enters TA present in the non-allowed area information.

Similarly, if the UE receives non-allowed area information for a DNN, then the UE does not initiate any NAS signalling related to the PDU session of the DNN only when the UE enters TA present in the non-allowed area information. The initiates any NAS signalling related to the PDU session of other DNN when the UE enters TA present in the non-allowed area information.

Similarly, if the UE receives non-allowed area information for an S-NSSAI and DNN, then the UE does not initiate NAS signalling related to the PDU session of the S-NSSAI and DNN only when the UE enters TA present in the non-allowed area information. The UE initiates any NAS signalling related to the PDU session of other S-NSSAI and DNN when the UE enters TA present in the non-allowed area information.

Detailed Step of Solution 4

Figure 4:
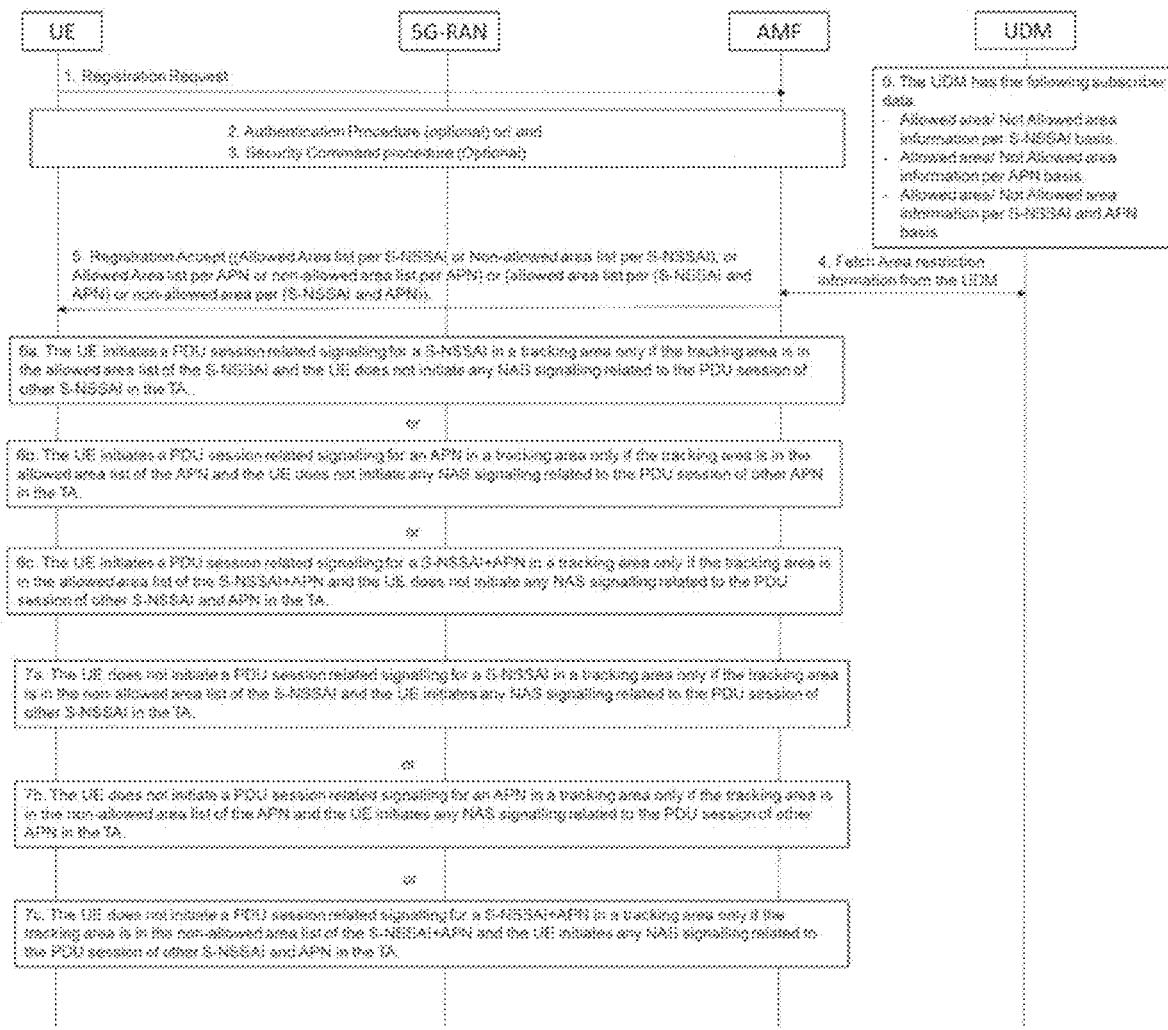
FIG. 4 illustrates allowed area information and non-allowed area information per service basis.

FIG. 4 shows that providing allowed area information and non-allowed area information are per service basis.

In step 0 of FIG. 4, the UDM has the following subscriber data per UE.
(1) Allowed area/Not Allowed area information per S-NSSAI basis.
(2) Allowed area/Not Allowed area information per APN basis.
(3) Allowed area/Not Allowed area information per S-NSSAI and APN basis.

In step 1 of FIG. 4, a UE sends the Registration Request message to the AMF.

In steps 2-3 of FIG. 4, the network may optionally perform authentication, security mode command or identity procedure during registration procedure.

In step 4 of FIG. 4, the AMF gets the subscriber information for the UE including area restriction related information.

In step 5 of FIG. 4, the network (e.g. AMF) provides allowed area information or non-allowed list per S-NSSAI or per APN or per S-NSSAI and APN basis during the registration procedure in the Registration Accept message or during the generic UE configuration update procedure in the CONFIGURATION UPDATE COMMAND message.

In step 6a of FIG. 4, if the UE receives allowed area information for an S-NSSAI, then the UE initiates NAS signalling related to the PDU session of the S-NSSAI only when the UE enters TA present in the allowed area information. The UE does not initiate any NAS signalling related to the PDU session of other S-NSSAI when the UE enters TA present in the allowed area information.

In step 6b of FIG. 4, if the UE receives allowed area information for a APN, then the UE initiates NAS signalling related to the PDU session of the APN only when the UE enters TA present in the allowed area information. The UE does not initiate any NAS signalling related to the PDU session of other APN when the UE enters TA present in the allowed area information.

In step 6c of FIG. 4, if the UE receives allowed area information for an S-NSSAI and APN, then the UE initiates NAS signalling related to the PDU session of the S-NSSAI and APN only when the UE enters TA present in the allowed area information. The UE does not initiate any NAS signalling related to the PDU session of other S-NSSAI and APN when the UE enters TA present in the allowed area information.

In step 7a of FIG. 4, if the UE receives non-allowed area information for an S-NSSAI, then the UE does not initiate NAS signalling related to the PDU session of the S-NSSAI only when the UE enters TA present in the non-allowed area information. The UE initiates any NAS signalling related to the PDU session of other S-NSSAI when the UE enters TA present in the non-allowed area information.

In step 7b of FIG. 4, if the UE receives non-allowed area information for a APN then the UE does not initiate any NAS signalling related to the PDU session of the APN only when the UE enters TA present in the non-allowed area information. The initiates any NAS signalling related to the PDU session of other APN when the UE enters TA present in the non-allowed area information.

In step 7c of FIG. 4, if the UE receives non-allowed area information for an S-NSSAI and APN then the UE does not initiate NAS signalling related to the PDU session of the S-NSSAI and APN only when the UE enters TA present in the non-allowed area information. The UE initiates any NAS signalling related to the PDU session of other S-NSSAI and APN when the UE enters TA present in the non-allowed area information.

In the above scenario, the AMF sends an allowed area information or a non-allowed area information per S-NSSAI basis to the 5G-RAN when the UE moves to the 5GMM-CONNECTED states. The 5G-RAN shall not perform handover to the non-allowed area when a user plane bearer related to S-NSSAI has been established. For emergency cases (e.g. IMS Emergency voice call) or Multimedia Priority Service (MPS) or mission critical service (MCS), the handover to the non-allowed area is allowed. The 5G-RAN handovers the UE to the allowed area of S-NSSAI when a user plane is established for the S-NSSAI. In one example the allowed area information or non-allowed area information is sent in the mobility restriction List IE in INITIAL CONTEXT SETUP REQUEST or HANDOVER REQUEST or DOWNLINK NAS TRANSPORT message as defined in 3GPP TS 38.413 V15.0.0 (2018-06). In another example the allowed area information or non-allowed area information is sent in a new Information element in a new NG-AP message or in an existing NG-AP message (e.g. INITIAL CONTEXT SETUP REQUEST or HANDOVER REQUEST or DOWNLINK NAS TRANSPORT).

In the above scenario, the AMF sends an allowed area information or a non-allowed area information per APN basis to the 5G-RAN when the UE moves to the 5GMM-CONNECTED states. The 5G-RAN shall not perform handover to the non-allowed area when a user plane bearer related to the APN has been established. The 5G-RAN handovers the UE to the allowed area of the APN when a user plane is established for the S-NSSAI. For emergency cases ((e.g. IMS Emergency voice call)) or Multimedia Priority Service (MPS) or mission critical service (MCS), the handover to the non-allowed area is allowed. In one example the allowed area information or non-allowed area information is sent in the mobility restriction List IE in INITIAL CONTEXT SETUP REQUEST or HANDOVER REQUEST or DOWNLINK NAS TRANSPORT message as defined in 3GPP TS 38.413 V15.0.0 (2018-06). In another example the allowed area information or non-allowed area information is sent in a new Information element in a new NG-AP message or in an existing NG-AP message (e.g. INITIAL CONTEXT SETUP REQUEST or HANDOVER REQUEST or DOWNLINK NAS TRANSPORT).

In the above scenario, the AMF sends an allowed area information or a non-allowed area information per S-NSSAI and APN basis to the 5G-RAN when the UE moves to the 5GMM-CONNECTED states. The 5G-RAN shall not perform handover to the non-allowed area when a user plane bearer related to the S-NSSAI and APN has been established. The 5G-RAN handovers the UE to the allowed area of the APN when a user plane is established for the S-NSSAI. For emergency cases (e.g. IMS Emergency voice call)) or Multimedia Priority Service (MPS) or mission critical service (MCS), the handover to the non-allowed area is allowed. In one example the allowed area information or non-allowed area information is sent in the mobility restriction List IE in INITIAL CONTEXT SETUP REQUEST or HANDOVER REQUEST or DOWNLINK NAS TRANSPORT message as defined in 3GPP TS 38.413 V15.0.0 (2018-06). In another example the allowed area information or non-allowed area information is sent in a new Information element in a new NG-AP message or in an existing NG-AP message (e.g. INITIAL CONTEXT SETUP REQUEST or HANDOVER REQUEST or DOWNLINK NAS TRANSPORT).

In one example in the above scenarios an APN is a DNN.

Another Embodiment

Any NAS messages mentioned above may be transmitted between the UE and AMF via a NGRAN node (i.e. gNB).

Furthermore, a part of sequences, procedures or messages mentioned above may be not always needed for identifying one or more inventions.

The User Equipment (or "UE", "mobile station", "mobile device" or "wireless device") in the present disclosure is an entity connected to a network via a wireless interface.

It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the Table 1 (source: 3GPP TS 22.368 V14.0.1 (2017-08), Annex B, the contents of which are incorporated herein by reference). This list is not exhaustive and is intended to be indicative of some examples of machine-type communication applications.

TABLE 1

Some examples of machine-type communication applications.

| Service Area | MTC applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present document. Needless to say, these technical ideas and embodiments are not limited to the above-described UE and various modifications can be made thereto.

Figure 5:
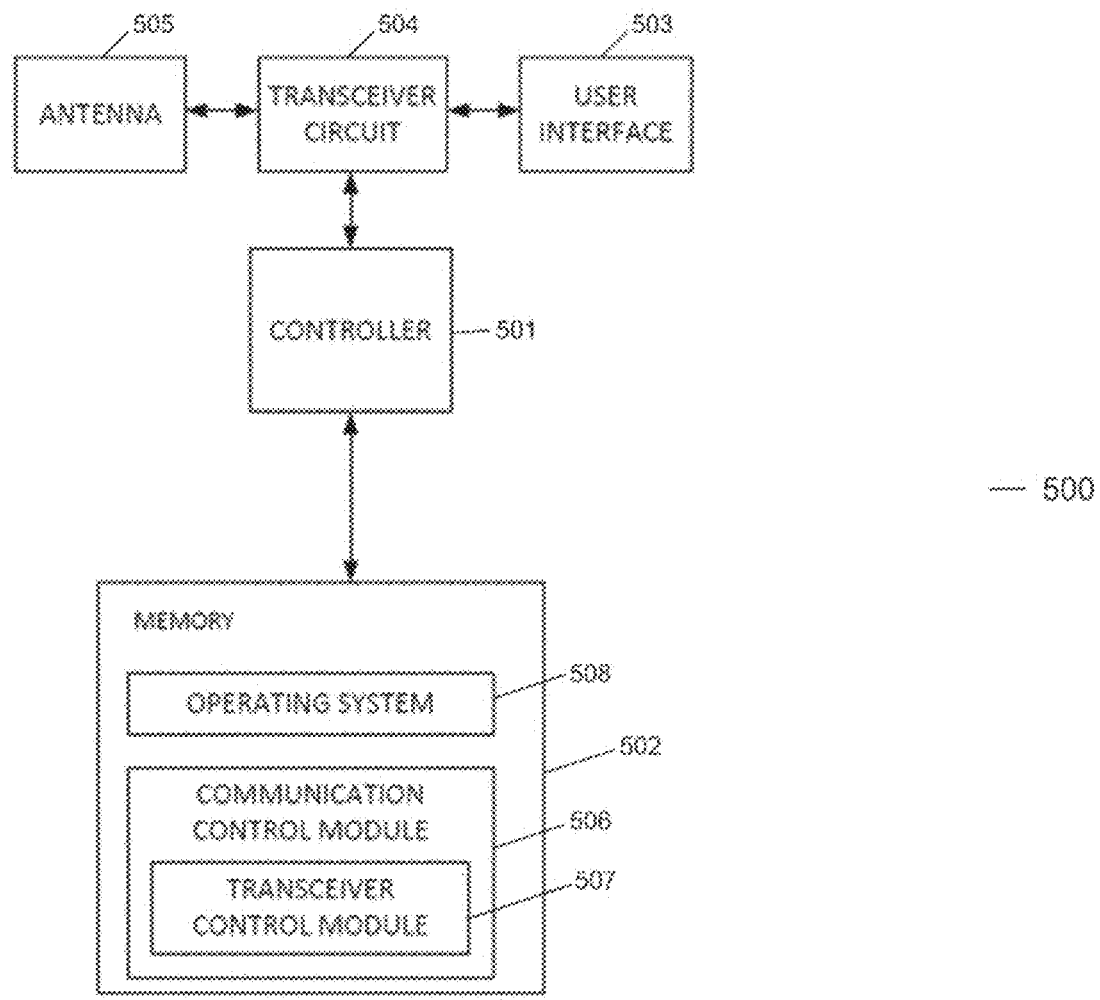
FIG. 5 illustrates general block diagram for UE.

FIG. 5 is a block diagram illustrating the main components of the UE (500). As shown, the UE includes a transceiver circuit (504) which is operable to transmit signals to and to receive signals from the connected node(s) via one or more antenna (505). Although not necessarily shown in FIG. 5, the UE will of course have all the usual functionality of a conventional mobile device (such as a user interface) and this may be provided by any one or any combination of hardware, software and firmware, as appropriate. Software may be pre-installed in the memory and/or may be downloaded via the telecommunication network or from a removable data storage device (RMD), for example.

A controller (501) controls the operation of the UE in accordance with software stored in a memory (502). For example, the controller may be realized by Central Processing Unit (CPU). The software includes, among other things, an operating system and a communications control module (506) having at least a transceiver control module (507). The communications control module (506) (using its transceiver control sub-module) is responsible for handling (generating/sending/receiving) signalling and uplink/downlink data packets between the UE and other nodes, such as the base station/(R)AN node, a MME, the AMF (and other core network nodes). Such signalling may include, for example, appropriately formatted signalling messages relating to connection establishment and maintenance (e.g. RRC messages), NAS messages such as periodic location update related messages (e.g. tracking area update, paging area updates, location area update) etc.

Figure 6:
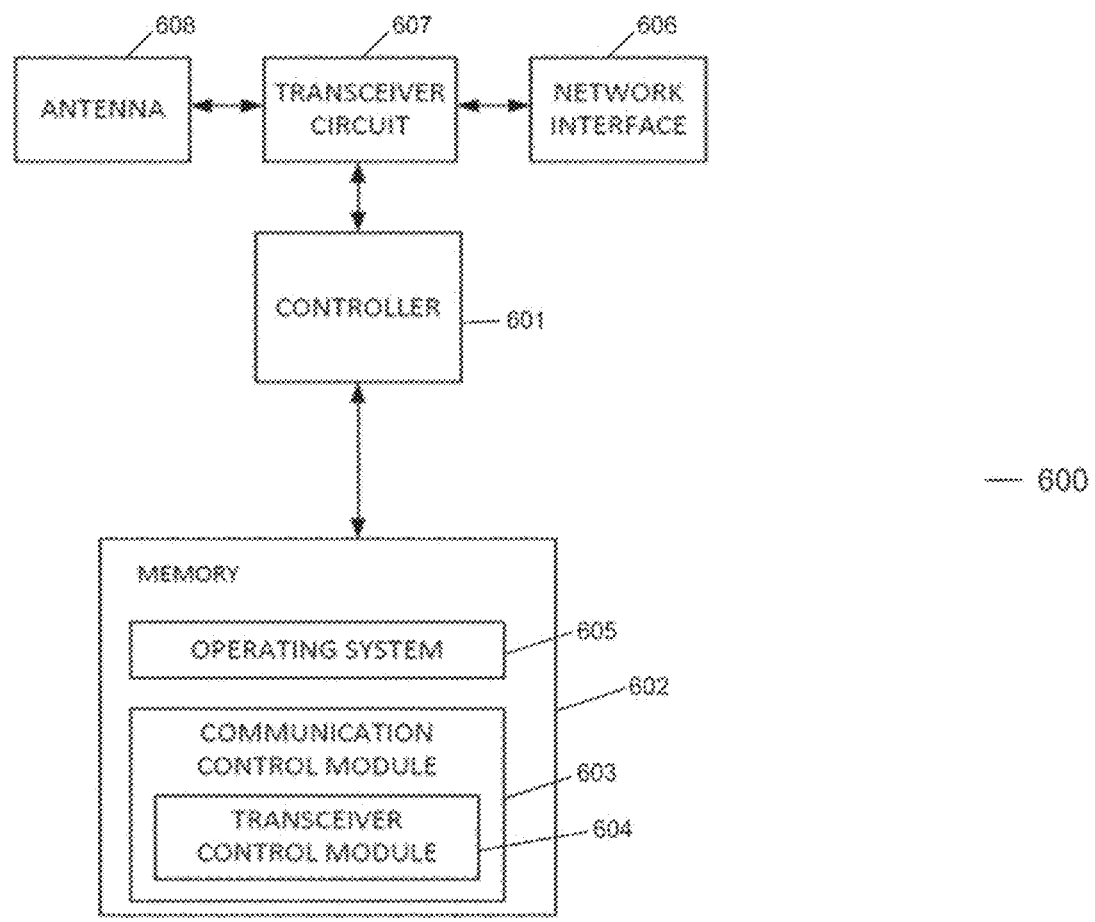
FIG. 6 illustrates general block diagram for (R)AN.

FIG. 6 is a block diagram illustrating the main components of an exemplary (R)AN node (600), for example a base station ('eNB' in LTE, 'gNB' in 5G). As shown, the (R)AN node (600) includes a transceiver circuit (607) which is operable to transmit signals to and to receive signals from connected UE(s) via one or more antenna (608) and to transmit signals to and to receive signals from other network nodes (either directly or indirectly) via a network interface. A controller (601) controls the operation of the (R)AN node in accordance with software stored in a memory (602). For example, the controller may be realized by Central Processing Unit (CPU). Software may be pre-installed in the memory and/or may be downloaded via the telecommunication network or from a removable data storage device (RMD), for example. The software includes, among other things, an operating system and a communications control module having at least a transceiver control module (604).

The communications control module (603) (using its transceiver control sub-module) is responsible for handling (generating/sending/receiving) signalling between the (R)AN node and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller is also configured (by software or hardware) to handle related tasks such as, when implemented, UE mobility estimate and/or moving trajectory estimation.

Figure 7:
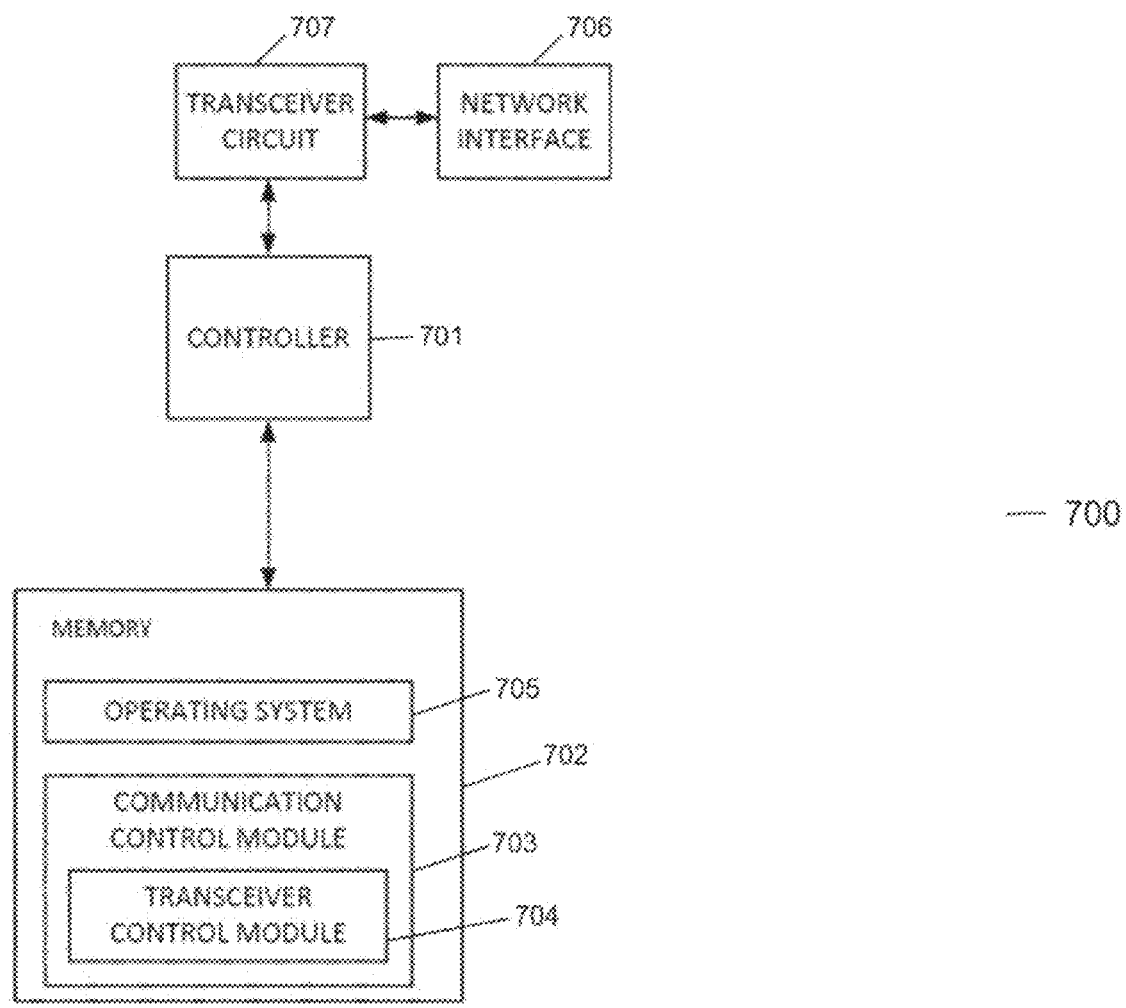
FIG. 7 illustrates general block diagram for AMF.

FIG. 7 is a block diagram illustrating the main components of the AMF (700). The AMF (700) is included in the 5GC. As shown, the AMF (700) includes a transceiver circuit (707) which is operable to transmit signals to and to receive signals from other nodes (including the UE) via a network interface. A controller (701) controls the operation of the AMF (700) in accordance with software stored in a memory. For example, the controller may be realized by Central Processing Unit (CPU). Software may be pre-installed in the memory and/or may be downloaded via the telecommunication network or from a removable data storage device (RMD), for example. The software includes, among other things, an operating system and a communications control module (703) having at least a transceiver control module (704).

The communications control module (using its transceiver control sub-module) is responsible for handling (generating/sending/receiving) signalling between the AMF and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

As will be appreciated by one of skill in the art, the present disclosure may be embodied as a method, and system. Accordingly, the present disclosure may take the form of an entirely hardware embodiment, a software embodiment or an embodiment combining software and hardware aspects.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. A general-purpose processor may be a microprocessor, but in the alternative, the processor may be any conventional processor, controller, microcontroller, or state machine. A processor may also be implemented as a combination of computing devices, e.g., a plurality of microprocessors, one or more microprocessors, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

This application is based upon and claims the benefit of priority from Indian patent applications No. 201811029944, filed on Aug. 9, 2018, the disclosure of which is incorporated herein in its entirety by reference.

REFERENCE SIGNS LIST

500 UE
501 controller
502 memory
503 user interface
504 transceiver circuit
505 antenna
506 communication control module
507 transceiver control module
508 operating system
600 (R)AN node
601 controller
602 memory
603 communications control module
604 transceiver control module
605 operating system
606 network interface
607 transceiver circuit
608 antenna
700 AMF
701 controller
702 memory
703 communications control module
704 transceiver control module
705 operating system
706 network interface
707 transceiver circuit

What is claimed is:

1. A method for a User Equipment (UE) in a mobile communication system, the method comprising:
sending a registration request message to an Access and Mobility Management Function (AMF) node;
receiving, from the AMF node, a registration accept message including area information per Data Network Name (DNN) and Single Network Slice Selection Assistance Information (S-NSSAI) during a registration procedure, wherein the area information includes a Tracking Area (TA); and
establishing a Protocol Data Unit (PDU) session for the DNN and the S-NSSAI in response to determining that the UE is in an area per the DNN and the S-NSSAI.

2. The method according to claim 1, further comprising:
refraining from establishing the PDU session for the DNN and the S-NSSAI in response to determining that the UE is out of the area per the DNN and the S-NSSAI.

3. The method according to claim 1, wherein the AMF node receives the area information from a Unified Data Management (UDM) node.

4. A method for an Access and Mobility Management Function (AMF) node in a mobile communication system, the method comprising:
 receiving a registration request message from a User Equipment (UE); and
 sending, to the UE, a registration accept message including the area information per Data Network Name (DNN) and Single Network Slice Selection Assistance Information (S-NSSAI) during a registration procedure, wherein the area information includes a Tracking Area (TA), to cause the UE to establish a Protocol Data Unit (PDU) session for the DNN and the S-NSSAI in response to determining that the UE is in an area per the DNN and the S-NSSAI.

5. The method according to claim 4, the method further comprising:
 refraining from establishing the PDU session for the DNN and the S-NSSAI in response to determining that the UE is out of the area per the DNN and the S-NSSAI.

6. A User Equipment (UE) in a mobile communication system, the UE comprising:
 a memory storing instructions; and
 at least one hardware processor configured to process the instruction to:
  send a registration request message to an Access and Mobility Management Function (AMF) node;
  receive, from the AMF node, a registration accept message including area information per Data Network Name (DNN) and Single Network Slice Selection Assistance Information (S-NSSAI) during a registration procedure, wherein the area information includes a Tracking Area (TA); and
  establish a Protocol Data Unit (PDU) session for the DNN and the S-NSSAI in response to determining that the UE is in an area per the DNN and the S-NSSAI.

7. An Access and Mobility Management Function (AMF) node in a mobile communication system, the AMF comprising:
 a memory storing instructions; and
 at least one hardware processor configured to process the instructions to:
  receive a registration request message from a User Equipment (UE); and
  send, to the UE, a registration accept message including the area information per Data Network Name (DNN) and Single Network Slice Selection Assistance Information (S-NSSAI) during a registration procedure, wherein the area information includes a Tracking Area (TA), to cause the UE to establish a Protocol Data Unit (PDU) session establishment for the DNN and the S-NSSAI in response to determining that the UE is in an area per the DNN and the S-NSSAI.

* * * * *

UNITED STATES PATENT AND TRADEMARK OFFICE
CERTIFICATE OF CORRECTION

| | |
|---|---|
| PATENT NO. | : 11,985,584 B2 |
| APPLICATION NO. | : 17/266733 |
| DATED | : May 14, 2024 |
| INVENTOR(S) | : Kundan Tiwari et al. |

Page 1 of 1

It is certified that error appears in the above-identified patent and that said Letters Patent is hereby corrected as shown below:

On the Title Page (*) Notice:
Delete "This patent is subject to a terminal disclaimer."

Signed and Sealed this
Twenty-ninth Day of April, 2025

Coke Morgan Stewart
*Acting Director of the United States Patent and Trademark Office*